US011676428B2

(12) United States Patent
Sebastian (10) Patent No.: US 11,676,428 B2
(45) Date of Patent: Jun. 13, 2023

(54) LED LIGHTING DEVICE WITH FAULT DETECTION, AND MOTOR VEHICLE

(71) Applicant: HELLA GmbH & Co. KGaA, Lippstadt (DE)

(72) Inventor: Helmut Sebastian, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/199,002

(22) Filed: Mar. 11, 2021

(65) Prior Publication Data

US 2021/0201604 A1 Jul. 1, 2021

Related U.S. Application Data

(63) Continuation of application No. PCT/EP2019/073325, filed on Sep. 2, 2019.

(30) Foreign Application Priority Data

Sep. 11, 2018 (DE) ...................... 10 2018 122 067.7

(51) Int. Cl.
*H05B 45/50* (2022.01)
*B60Q 1/04* (2006.01)
(Continued)

(52) U.S. Cl.
CPC ........... *G07C 5/0808* (2013.01); *H05B 45/54* (2020.01); *H05B 45/58* (2020.01); *B60Q 1/04* (2013.01); *B60Q 2400/20* (2013.01)

(58) Field of Classification Search
CPC ........ H05B 45/50; H05B 45/54; H05B 45/58; B60Q 1/04; B60Q 11/00; B60Q 11/005; B60Q 2400/00
See application file for complete search history.

(56) References Cited

U.S. PATENT DOCUMENTS 9,341,664 B2 5/2016 Jezersky et al.
2008/0204029 A1 8/2008 Mihai et al.
(Continued)

FOREIGN PATENT DOCUMENTS

DE 102012107766 A1 2/2013
DE 102014100738 A1 7/2014
(Continued)

OTHER PUBLICATIONS

International Search Report dated Oct. 17, 2019 in corresponding application PCT/EP2019/073325.

*Primary Examiner* — Thai Pham
(74) *Attorney, Agent, or Firm* — Muncy, Geissler, Olds & Lowe, P.C.

(57) ABSTRACT

An LED lighting device having an LED lamp series circuit with a first LED lamp and with a second LED lamp that is coupled to the first LED lamp through a lamp coupling point, an anode, a cathode, driver electronics for connection to the anode and the cathode for operation of the LED lamp series circuit, and a detection device for detecting a failure of the first LED lamp and the second LED lamp. The detection device, together with the first LED lamp and the second LED lamp, forms a first measuring bridge circuit. In addition, the invention relates to a motor vehicle with an LED lighting device according to the invention.

13 Claims, 4 Drawing Sheets

(51) Int. Cl.
*G07C 5/08* (2006.01)
*H05B 45/58* (2020.01)
*H05B 45/54* (2020.01)

(56) References Cited

U.S. PATENT DOCUMENTS

| | | | |
|---|---|---|---|
| 2010/0264828 A1* | 10/2010 | Cortigiani | H05B 45/54 |
| | | | 315/130 |
| 2012/0161649 A1* | 6/2012 | Hamamoto | H05B 45/38 |
| | | | 315/187 |
| 2012/0187847 A1* | 7/2012 | Hamamoto | H05B 45/3725 |
| | | | 315/125 |
| 2012/0206146 A1 | 8/2012 | Avenel | |
| 2017/0109997 A1* | 4/2017 | Brooks | B60Q 11/005 |
| 2019/0132917 A1* | 5/2019 | Veenstra | G01R 31/44 |

FOREIGN PATENT DOCUMENTS

| | | | |
|---|---|---|---|
| JP | 2010278039 A | * | 12/2010 |
| JP | 2010278039 A | | 12/2010 |
| WO | WO2008061301 A1 | | 5/2008 |

* cited by examiner

LED LIGHTING DEVICE WITH FAULT DETECTION, AND MOTOR VEHICLE

This nonprovisional application is a continuation of International Application No. PCT/EP2019/073325, which was filed on Sep. 2, 2019 and which claims priority to German Patent Application No. 10 2018 122 067.7, which was filed in Germany on Sep. 11, 2018 and which are both herein incorporated by reference.

BACKGROUND OF THE INVENTION

Field of the Invention

The present invention relates to an LED (Light Emitting Diode) lighting device, in particular for a motor vehicle, having an LED lamp series circuit with a first LED lamp and a second LED lamp that is coupled to the first LED lamp through a lamp coupling point, an anode, a cathode, driver electronics for connection to the anode and the cathode for operation of the LED lamp series circuit, and a detection device for detecting a failure of the first LED lamp and the second LED lamp. In addition, the invention relates to a motor vehicle with an LED lighting device.

Description of the Background Art

LED lighting devices have one or more LED lamps, wherein an LED lamp has one or two LED light-emitting elements, in particular LED light-emitting elements connected in series. LED light-emitting elements are also referred to colloquially as light-emitting diodes. The LED lamps are usually wired to one another in a series circuit. LED lighting devices have various advantages as compared with conventional, incandescent filament-based lighting devices. One particular advantage is a substantially higher efficiency, so that an LED lighting device has a substantially lower power consumption than a conventional lighting device to achieve the same light intensity. The reason for this is, in particular, that less electrical energy is converted into waste heat in the case of the LED lighting device. Another advantage is the long service life. Whereas conventional lighting devices are subjected to very high thermal stress because of the high operating temperatures, and thus often have only a few hundred operating hours, lifetimes of over 100,000 operating hours are no longer unusual for LED lighting devices. Moreover, the service life of conventional lighting devices is reduced with intermittent operation to a substantially greater degree than is the case for LED lighting devices. For this reason, LED lighting devices are more reliable and thus lower-maintenance than conventional lighting devices. Finally, the manufacturing costs of LED lighting devices have dropped dramatically in comparison with conventional lamps on account of improved manufacturing processes as well as increasing quantities.

Because of the many advantages over conventional lamps, the use of LED lighting devices, in particular with high-performance LED lamps, is continually increasing, whereas the dissemination of conventional lighting devices is declining sharply. In the automotive industry, for instance, LED lighting devices are used as headlights and also as other illumination devices.

In particular on account of legal requirements and special specifications of automotive manufacturers, LED lighting devices must oftentimes have a fault recognition device for recognizing faults in the LED lamps. Interruptions in the series circuit of the LED lamps can be reliably detected by means of such fault recognition devices.

A disadvantage of known lighting devices is that a fault recognition in the event of a short circuit of an LED lamp or an LED light-emitting element cannot be reliably ensured or can only be ensured at high cost. The risk of a short circuit of an LED lamp is elevated, in particular on account of specific LED construction techniques and a maximum exploitation of the LED lamps up to their performance limit that is prevalent for design reasons in order to achieve an especially high light output from the most economical LED lamp possible. With increasing numbers of series-connected LED lamps, such short circuits are more difficult to detect, since a change in a voltage characteristic caused by the short circuit is only very small. Moreover, voltage characteristics in the series circuit depend on additional parameters, such as, e.g., an ambient temperature and a manufacturing tolerance of the LED lamp. This has the consequence that it often is only possible with known fault recognition devices to diagnose the short circuit of multiple LED lamps.

Furthermore, individual monitoring of the LED lamps by measurement means is relatively expensive on account of the high number of wires and interfaces to the driver electronics of the LED lighting device, and therefore is only suitable to a limited degree for mass production.

SUMMARY OF THE INVENTION

It is therefore an object of the present invention to overcome or at least partially overcome the above-described disadvantages in an LED lighting device and in a motor vehicle. In particular, it is the object of the present invention to create an LED lighting device and a motor vehicle that are designed to recognize a failure of an LED lamp in a simple and economical manner.

According to a first aspect of the invention, the object is attained by an LED lighting device. The LED lighting device has an LED lamp series circuit with a first LED lamp and with a second LED lamp that is coupled to the first LED lamp through a lamp coupling point, an anode, a cathode, driver electronics for connection to the anode and the cathode for operation of the LED lamp series circuit, and a detection device for detecting a failure of the first LED lamp and the second LED lamp. According to the invention, the detection device, together with the first LED lamp and the second LED lamp, forms a first measuring bridge circuit.

The LED lamp series circuit has multiple LED lamps that are connected to one another in series. The LED lamp series circuit has at least the first LED lamp and the second LED lamp in any case. In addition, provision can be made that the LED lamp series circuit has additional LED lamps that are likewise connected in series with the first LED lamp and the second LED lamp. The first LED lamp is electrically coupled to the second LED lamp through the lamp coupling point. According to the invention, a region that is formed in the flow of current between the first LED lamp and the second LED lamp can be referred to as a lamp coupling point. Preferably, the anode and/or the cathode are implemented directly at the LED lamp series circuit, in particular at end regions of the LED lamp series circuit. Electrical coupling is understood within the scope of the invention to mean, in particular, a direct electrical coupling, for example through an electrical line or a direct electrical connection of the electronic components in question. An electrical coupling of two electronic components can also be accomplished according to the invention by means of an interposition of another electronic component, such as, e.g., a resistor, a diode, or the like.

An LED lamp is understood within the scope of the invention to mean a lamp that has a minimum of one and a maximum of two LED light-emitting elements, such as, e.g., light-emitting diodes. Accordingly, in the simplest case an LED lamp corresponds to an LED light-emitting element. If the LED lamp has two LED light-emitting elements, the LED light-emitting elements are preferably connected to one another in series. A parallel connection of the two LED light-emitting elements can likewise be provided according to the invention.

The driver electronics are designed to operate the LED lighting device. This includes, in particular, the provision of a defined electric current from a power source, such as, e.g., an automotive battery or the like. For operation of the LED lighting device, the driver electronics are electrically coupled to the anode and the cathode.

The detection device of the LED lighting device is designed to detect, in combination with the first LED lamp and the second LED lamp, a failure of the first LED lamp and a failure of the second LED lamp. Accordingly, the detection device is designed to detect a short circuit of the first LED lamp. The detection device is likewise designed to detect a short circuit of the second LED lamp. Preferably, the detection device is designed to detect a failure of each LED lamp of the LED lamp series circuit.

To detect a failure of the first LED lamp and of the second LED lamp, the detection device is designed to form, together with the first LED lamp and the second LED lamp, a first measuring bridge circuit. The measuring bridge circuit can be designed in accordance with a Wheatstone bridge circuit, for example. A short circuit or an open circuit of the first LED lamp or of the second LED lamp causes an unbalance of the measuring bridge circuit, which is detectable by simple means. The unbalance of the measuring bridge circuit is far more strongly pronounced, and thus markedly simpler to detect, than a voltage change of a conventional LED series circuit in the event of a short circuit of an LED lamp. A detection result, such as, e.g., the unbalance of the measuring bridge circuit or the presence of a failure of an LED lamp, can be transmitted to the driver electronics and by simple means, in particular as binary information or the like.

An LED lighting device according to the invention has the advantage over conventional LED lighting devices that a failure, in particular a short circuit, of an LED lamp of the LED lighting device is reliably detectable with simple means and in an economical manner. By means of the measuring bridge circuit, even small failures, such as, e.g., a short circuit of an LED lamp, cause a large unbalance that can be detected with relatively little complexity, in particular by means of a signal processing device. Costly measuring electronics are thus unnecessary. Furthermore, no resource-intensive additional lines are required between the LED lamps and the driver electronics. Moreover, there is no need for separate analog measuring channels on the driver electronics for the LED lamps, so the manufacturing costs of the LED lighting device according to the invention are significantly lower as compared with conventional LED lighting devices.

According to a preferred improvement of the invention, provision can be made in an LED lighting device that the detection device has a first resistor and a second resistor, wherein the first resistor and the second resistor are connected to one another in series and form a common resistor coupling point between one another, wherein the first resistor and the second resistor have the same ohmic resistance, wherein the detection device has a first transistor and a second transistor, wherein a first base of the first transistor and a second base of the second transistor form a common base coupling point, and wherein the base coupling point is electrically coupled to the resistor coupling point through a third resistor. Preferably, the ohmic resistance of the first resistor and that of the second resistor are greater, in particular at least 50% greater, than an ohmic resistance of the first LED lamp and that of the second LED lamp. In this way, a loading of the driver electronics by the measuring electronics can be reduced. Preferably, a resistance ratio of the first resistor and the second resistor corresponds to a resistance ratio of the first LED lamp and the second LED lamp. A reliability of the measuring bridge circuit can be improved as a result. A resistor is understood within the scope of the invention as an electronic component that has an ohmic resistance. This is preferably an electronic component referred to as a resistor, but can also be designed as a different electronic component with an ohmic resistance, such as, e.g., an LED of the same series, an electric load, or the like. A first resistor, a second resistor, a first transistor, and a second transistor have the advantage that they are economical and easily available and are especially suitable for creating the measuring bridge circuit. In this way, an especially reliable measuring bridge circuit can be realized with simple means and in an economical manner. As a result, the detectability of a failed LED lamp is improved.

A first emitter of the first transistor can be electrically coupled to a second emitter of the second transistor and to the lamp coupling point. Accordingly, the first transistor is preferably designed as an NPN transistor and the second transistor is preferably designed as a PNP transistor. In this way, an especially reliable measuring bridge circuit can be realized with simple means and in an economical manner. As a result, the detectability of a failed LED lamp is improved.

A first collector of the first transistor and a second collector of the second transistor can be electrically coupled to a signal processing device of the LED lighting device. The signal processing device is designed to detect an unbalance of the measuring bridge circuit, in particular caused by a short circuit of the first LED lamp or of the second LED lamp, and to transmit this to the driver electronics. By means of such an interconnection, an especially reliable measuring bridge circuit can be realized with simple means and in an economical manner. As a result, the detectability of a failed LED lamp is improved.

In an example, provision can be made in an LED lighting device that the signal processing device has a third transistor, wherein a third emitter of the third transistor is electrically coupled to the anode or to a positive voltage supply of the LEDs, wherein a third base of the third transistor is electrically coupled to the first collector through a fourth resistor, wherein a third collector of the third transistor is electrically coupled to the cathode or to a negative voltage supply of the LEDs through a first diode and a fifth resistor, and wherein the second collector of the second transistor is electrically coupled to a region between the first diode and the fifth resistor through a second diode. By means of such a signal processing device, the detectability of a failed LED lamp is improved with simple means and in an economical manner.

Preferably, the driver electronics can be designed to control an operating state of the LED lamp series circuit as a function of a signal analyzed by the signal processing device. Also preferred is that the driver electronics and/or the signal processing device are designed to indicate a detected fault of an LED lamp. The driver electronics are designed, in particular, to switch on an emergency operation state of the LED lamp series circuit when a failure of an LED lamp is detected in order to avoid failures of additional LED lamps, in particular on account of overvoltage. This has the advantage of ensuring, with simple means and in an economical manner, a temporary operation of the LED lighting device, even with failed LED lamps, until a repair. According to a preferred embodiment of the invention, the LED lighting device has a third LED lamp and a sixth resistor, wherein the third LED lamp, together with the second LED lamp, the second resistor, and the sixth resistor, forms a second measuring bridge circuit. The third LED lamp is preferably arranged in the LED lamp series circuit directly downstream of the second LED lamp. Accordingly, the sixth resistor is preferably arranged directly downstream of the second resistor in the direction of current flow. According to the invention, such an interconnection can be expanded arbitrarily so that adjacent LED lamps in each case form a measuring bridge circuit together with adjacent resistors in each case. This has the advantage that a reliable monitoring of the LED lamps can be ensured with simple means and in an economical manner, even for LED lamp series circuits with a multiplicity of LED lamps.

The LED lighting device can have a third LED lamp and a sixth resistor, wherein the third LED lamp, together with the second LED lamp, the second resistor, and the sixth resistor, forms a part of a second measuring bridge circuit, wherein the second measuring bridge circuit is electrically coupled to the signal processing device. The third LED lamp is preferably arranged in the LED lamp series circuit directly downstream of the second LED lamp. Accordingly, the sixth resistor is preferably arranged directly downstream of the second resistor in the direction of current flow. In order to realize the second measuring bridge circuit, the LED lighting device preferably has additional electronic components, such as, e.g., transistors, resistors, or the like. Preferably, the second measuring bridge circuit is designed in accordance with the first measuring bridge circuit. According to the invention, such an interconnection can be expanded arbitrarily so that adjacent LED lamps in each case form a new measuring bridge circuit together with adjacent resistors and the additional electronic components, in particular transistors, resistors, and the like, in each case. All of the individual measuring bridge circuits preferably are electrically coupled to the signal processing device. In this way, an unbalance of any arbitrary measuring bridge circuit can be detected by the signal processing device. Therefore, since a failure of an LED lamp automatically causes an unbalance of two adjacent measuring bridge circuits, the failed LED lamp is easy to identify. This is advantageous, in particular, when multiple LED lamps have failures. Such an interconnection has the advantage that a reliable monitoring of the LED lamps can be ensured with simple means and in an economical manner, even for LED lamp series circuits with a multiplicity of LED lamps.

The first resistor can be designed as a fourth LED lamp and/or the second resistor is designed as a fifth LED lamp. Accordingly, the LED lighting device preferably has two LED lamp series circuits connected in parallel with one another that together form the first measuring bridge circuit as well as any additional measuring bridge circuits. This has the advantage that the manufacturing costs for the LED lighting device can be further reduced in this way.

According to a second aspect of the invention, the object is attained by a motor vehicle with an LED lighting device. According to the invention, the LED lighting device is designed as an LED lighting device in accordance with the invention.

All the advantages that have already been described for an LED lighting device according to the first aspect of the invention arise in the case of the motor vehicle described. Accordingly, the motor vehicle according to the invention has the advantage over conventional motor vehicles that a failure, in particular a short circuit, of an LED lamp of the LED lighting device of the motor vehicle is reliably detectable with simple means and in an economical manner. By means of the measuring bridge circuit, even small failures, such as, e.g., a short circuit of an LED lamp, cause a large unbalance that can be detected with relatively little complexity, in particular by means of a signal processing device. Costly measuring electronics are thus unnecessary. Furthermore, no resource-intensive additional lines are required between the LED lamps and the driver electronics. Moreover, there is no need for separate analog measuring channels on the driver electronics for the LED lamps, so the manufacturing costs of the LED lighting device according to the invention are significantly lower as compared with conventional LED lighting devices. As a result, the manufacturing costs of the motor vehicle according to the invention can be reduced in comparison with conventional motor vehicles.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
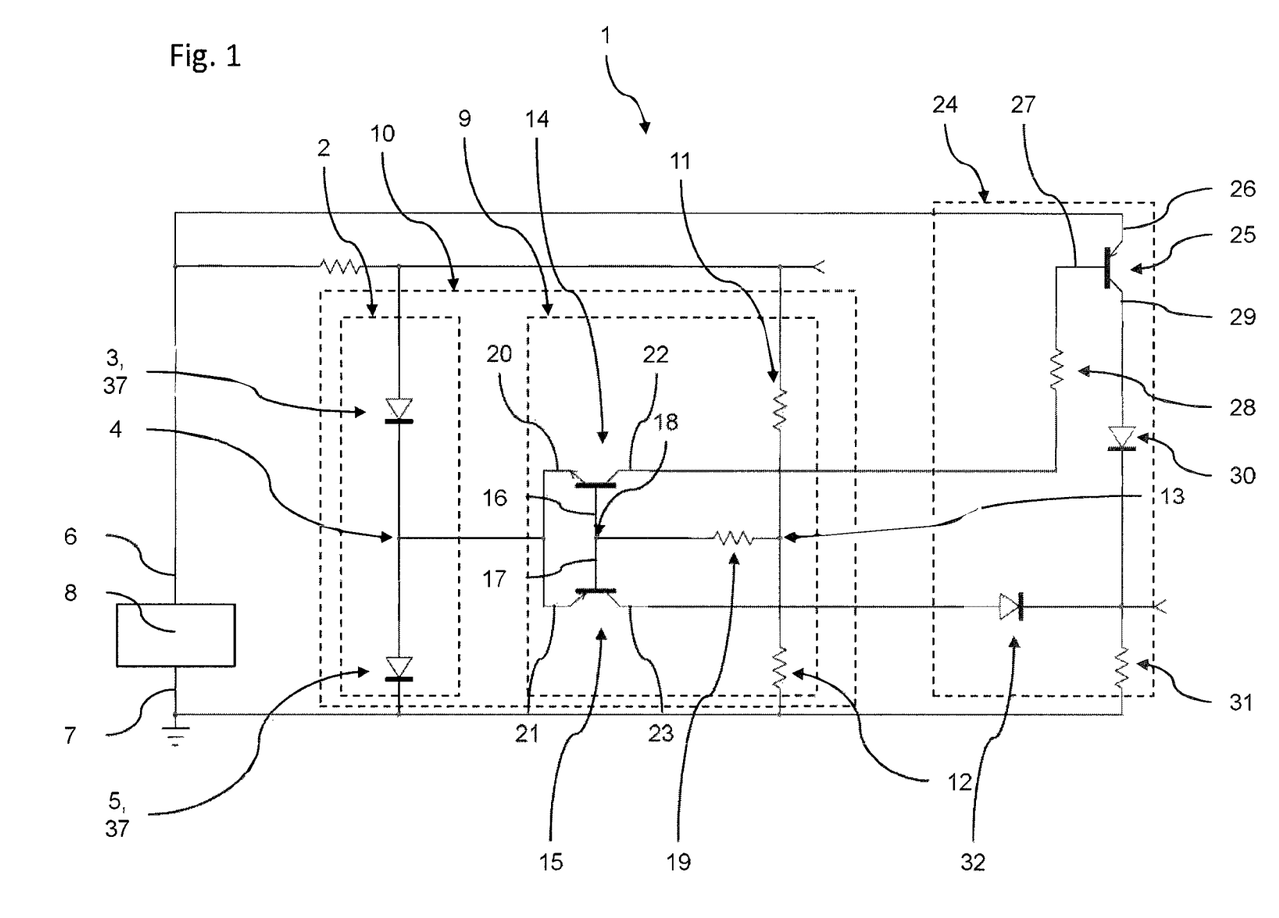
FIG. 1 is a circuit diagram of an exemplary embodiment of an LED lighting device according to the invention.

In FIG. 1, an LED lighting device 1 according to the invention is illustrated schematically in a circuit diagram. The LED lighting device 1 has an LED lamp series circuit 2 with a first LED lamp 3 implemented as an LED light-emitting element 37 and with a second LED lamp 5 implemented as an LED light-emitting element 37. The first LED lamp 3 is thus connected in series with the second LED lamp 5, forming a lamp coupling point 4. In addition, the LED lighting device 1 has an anode 6, a cathode 7, and driver electronics 8, wherein the driver electronics 8 are electrically coupled to the anode 6 and to the cathode 7. Connections of the driver electronics 8 for an external power source are not shown. Finally, the LED lighting device 1 has a detection device for detecting a failure of the first LED lamp 3 and/or of the second LED lamp 5. The detection device 9, together with the first LED lamp 3 and the second LED lamp 5, forms a first measuring bridge circuit 10. Finally, the LED lighting device 1 has a signal processing device 24 for analyzing an unbalance of the first measuring bridge circuit 10, and for relaying the analysis to the driver electronics 8.

The detection device 9 has a first resistor 11 and a second resistor 12, which are connected to one another in series, forming a resistor coupling point 13. The first resistor 11 is electrically coupled to the anode 6, and the second resistor 12 is electrically coupled to the cathode 7. Consequently, the series circuit formed of the first resistor 11 and the second resistor 12 is connected in parallel to the LED lamp series circuit. Furthermore, the detection device 9 has a first transistor 14 with a first base 16, a first emitter 20, and a first collector 22, and also has a second transistor with a second base 17, a second collector 23, and a second emitter 21. The first base 16 is electrically coupled to the second base 17, forming a base coupling point 18, wherein the base coupling point 18 is electrically coupled to the resistor coupling point 13 through a third resistor 19. The first emitter 20 is electrically coupled to the second emitter 21 and to the lamp coupling point 4.

The signal processing device 24 has a third transistor 25 with a third emitter 26, a third base 27, and a third collector 29. A third resistor 19 of the signal processing device 24 is electrically coupled to the first collector 22 and to the third base 27. The third emitter 26 is electrically coupled to the anode 6. The third collector 29 is electrically coupled to the cathode through a first diode 30 and a fifth resistor 31. The second collector 23 is electrically coupled to a region between the first diode 30 and the fifth resistor 31 through a second diode 32.

The behavior of the LED lighting device 1 in the event of a failure of an LED lamp is described below. When the first LED lamp 3 has an open circuit, the voltage of the series circuit of the first resistor 11 and the second resistor 12 of the detection device 9 rises. A voltage at the lamp coupling point 4, wherein a voltage at the resistor coupling point 13 rises, although not to the same degree as the voltage drop at the lamp coupling point 4. A voltage between the first base 16 and the first emitter 20 likewise rises, causing the first transistor 14 to become electrically conductive. Accordingly, the third transistor 25 also becomes electrically conductive on account of the fourth resistor 28. Consequently, a detectable voltage arises at the fifth resistor 31, which provides information about the fault condition.

When the first LED lamp 3 has a short circuit, a voltage at the first LED lamp is approximately 0V. Moreover, the voltage of the series circuit of the first resistor 11 and the second resistor 12 of the detection device 9 drops. The voltage at the lamp coupling point 4 is therefore close to the voltage of the voltage [sic; "of the voltage" should be deleted] of the series circuit of the first resistor 11 and the second resistor 12. The voltage at the resistor coupling point 13, accordingly, is approximately half the voltage of the lamp coupling point 4. In this way, an increase in a magnitude of a negative voltage between the second base 17 and the second emitter 21 is brought about so that the second transistor 15 becomes conductive. A voltage is supplied to the fifth resistor 31 through the second diode 32. Consequently, a detectable voltage arises at the fifth resistor 31, which provides information about the fault condition.

Figure 2:
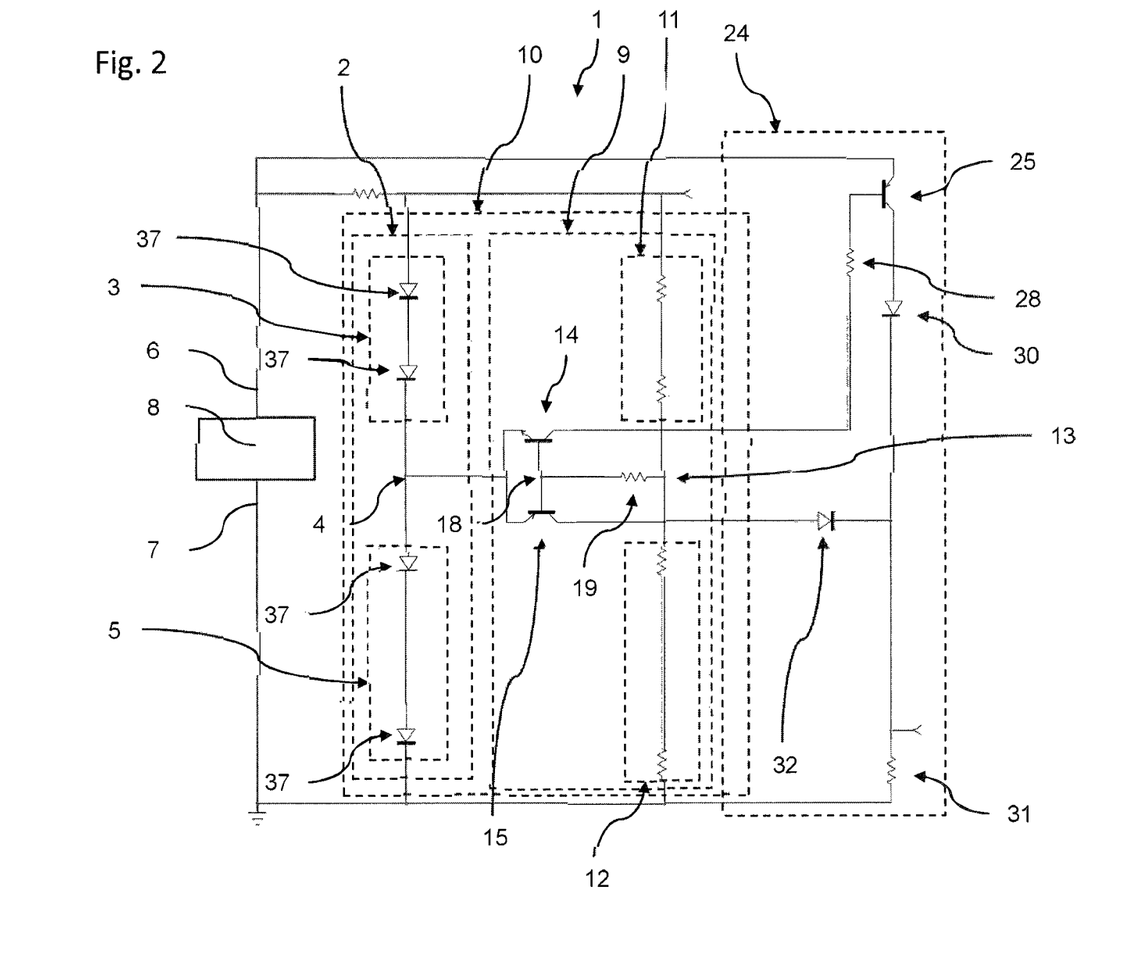
FIG. 2 is a circuit diagram of an exemplary embodiment of an LED lighting device according to the invention.

In FIG. 2, an LED lighting device 1 according to the invention is illustrated schematically in a circuit diagram. The second embodiment differs from the first embodiment in that the first LED lamp 3 and the second LED lamp 5 each have two LED light-emitting elements 37 connected in series. Moreover, the first resistor 11 and the second resistor 12 each have two single resistors connected in series.

Figure 3:
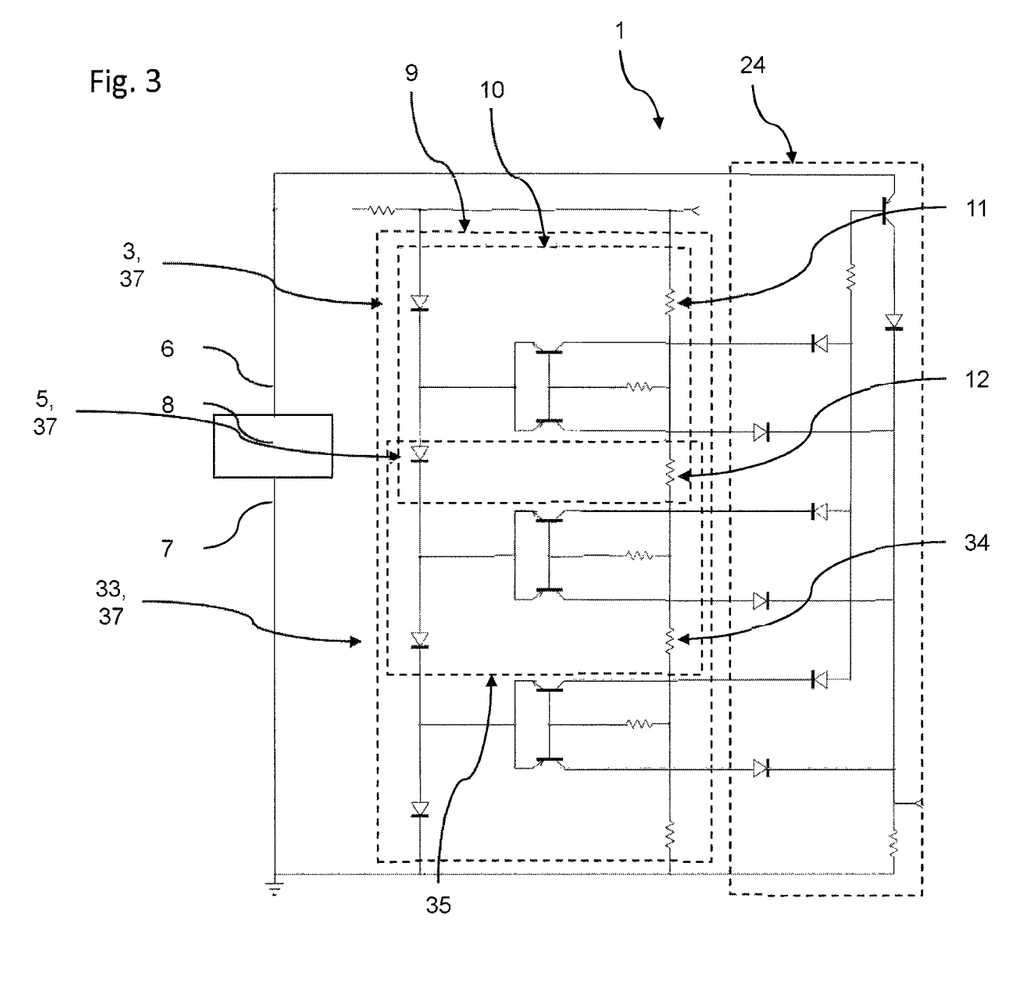
FIG. 3 is a circuit diagram of an exemplary embodiment of an LED lighting device according to the invention.

In FIG. 3, an LED lighting device 1 according to the invention is illustrated schematically in a circuit diagram. In the third embodiment, the LED lamp series circuit 2 has two additional LED lamps, such as, e.g., a third LED lamp. Moreover, the detection device 9 is designed such that the second LED lamp 5 and the third LED lamp 33, together with the detection device 9 or a part of the detection device 9, form a second measuring bridge circuit 35, wherein the second measuring bridge circuit 35 corresponds to, or at least substantially corresponds to, the first measuring bridge circuit 10 in terms of technical structure. The second measuring bridge circuit 35 likewise is electrically coupled to the signal processing device 24 in accordance with the first measuring bridge circuit 10.

Figure 4:
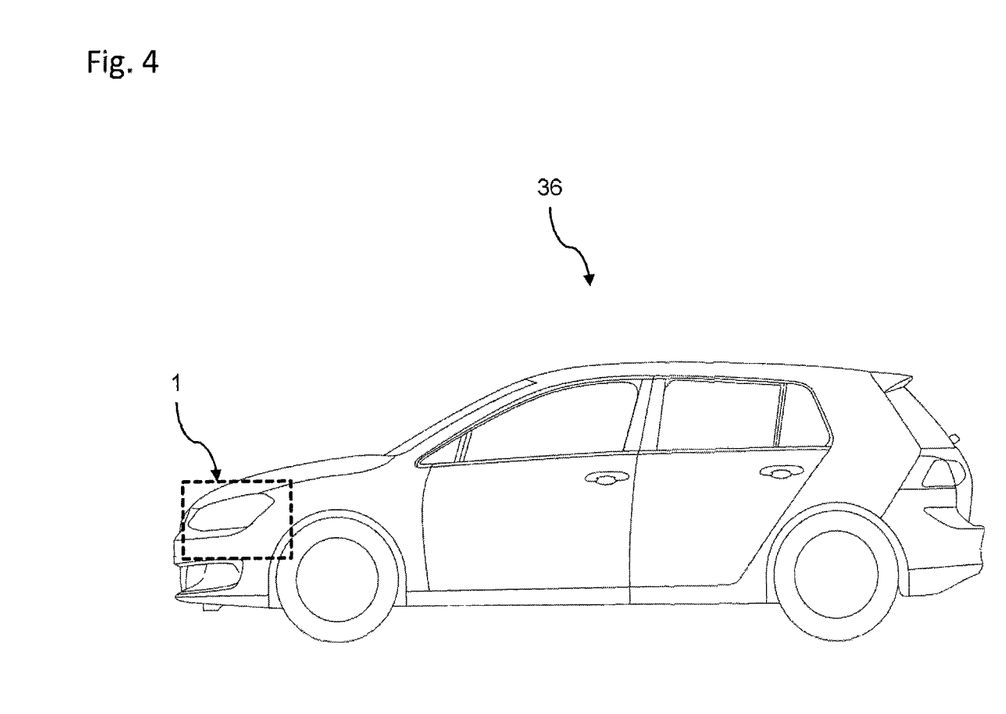
FIG. 4 shows an exemplary embodiment of a motor vehicle according the invention shown schematically in a side view.

FIG. 4 schematically shows a preferred embodiment of a motor vehicle 36 according the invention in a side view. The motor vehicle 36 has an LED lighting device 1 according to the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A light emitting diode (LED) lighting device comprising:
   an LED lamp series circuit having a first LED lamp and a second LED lamp electrically coupled to one another in series is coupled to the first LED lamp through a lamp coupling point;
   an anode, which is a positive electrode supply of the first LED lamp and the second LED lamp;
   a cathode, which is a negative electrode supply of the first LED lamp and the second LED lamp;
   driver electronics for connection to the anode and the cathode for operation of the LED lamp series circuit;
   a signal processing device; and
   a detection device for detecting a failure of the first LED lamp and the second LED lamp, the detection device comprising:
      a first resistor;
      a second resistor;
      a third resistor;
      a fourth resistor;
      a first transistor having a first collector;
      a second transistor having a second collector; and
      a third transistor electrically coupled to the first collector of the first transistor through the fourth resistor,
   wherein the first collector of the first transistor and the second collector of the second transistor are coupled to the signal processing device of the LED lighting device,
   wherein the detection device, together with the first LED lamp and the second LED lamp, forms a first measuring bridge circuit, and
   wherein the failure of the first LED lamp and the second LED lamp is detected by detecting an unbalance of the first measuring bridge circuit through the signal processing device.

2. The LED lighting device according to claim 1, wherein the first resistor and the second resistor are connected to one another in series and form a common resistor coupling point between one another,
wherein the first resistor and the second resistor have the same ohmic resistance,
wherein a first base of the first transistor and a second base of the second transistor form a common base coupling point, and
wherein the base coupling point is electrically coupled to the resistor coupling point through the third resistor.

3. The LED lighting device according to claim 2, wherein a first emitter of the first transistor is electrically coupled to a second emitter of the second transistor and to the lamp coupling point.

4. The LED lighting device according to claim 3, wherein the LED lighting device has a third LED lamp, a fifth resistor and a sixth resistor, wherein the third LED lamp, together with the second LED lamp, the second resistor, and the sixth resistor forms a part of a second measuring bridge circuit, and wherein the second measuring bridge circuit is electrically coupled to the signal processing device.

5. The LED lighting device according to claim 1, wherein the LED lighting device has a third LED lamp, a fifth resistor and a sixth resistor, wherein the third LED lamp, together with the second LED lamp, the second resistor, and the sixth resistor, forms a second measuring bridge circuit.

6. A Motor vehicle comprising an LED lighting device according to claim 1.

7. The LED lighting device according to claim 1, wherein the first transistor has a first emitter coupled to the lamp coupling point and the second transistor has a second emitter coupled to the first emitter.

8. The LED lighting device according to claim 1, wherein a third emitter of the third transistor is electrically coupled to the anode.

9. The LED lighting device according to claim 1, wherein a third base of the third transistor is electrically coupled to the first collector through the third resistor.

10. The LED lighting device according to claim 1, wherein a third collector of the third transistor is electrically coupled to the cathode through a first diode and the fourth resistor.

11. The LED lighting device according to claim 10, wherein the second collector of the second transistor is electrically coupled to a region between the first diode and the fourth resistor through a second diode.

12. A light emitting diode (LED) lighting device comprising:
an LED lamp series circuit having a first LED lamp and a second LED lamp electrically coupled to one another in series is coupled to the first LED lamp through a lamp coupling point;
an anode, which is a positive electrode supply of the first LED lamp and the second LED lamp;
a cathode, which is a negative electrode supply of the first LED lamp and the second LED lamp;
driver electronics for connection to the anode and the cathode for operation of the LED lamp series circuit; and
a detection device for detecting a failure of the first LED lamp and the second LED lamp,
wherein the detection device, together with the first LED lamp and the second LED lamp, forms a first measuring bridge circuit,
wherein the detection device has a first resistor and a second resistor,
wherein the first resistor and the second resistor are connected to one another in series and form a common resistor coupling point between one another,
wherein the first resistor and the second resistor have the same ohmic resistance,
wherein the detection device has a first transistor and a second transistor,
wherein a first base of the first transistor and a second base of the second transistor form a common base coupling point, and
wherein the base coupling point is electrically coupled to the resistor coupling point through a third resistor,
wherein a first emitter of the first transistor is electrically coupled to a second emitter of the second transistor and to the lamp coupling point,
wherein a first collector of the first transistor and a second collector of the second transistor are electrically coupled to a signal processing device of the LED lighting device, and
wherein the signal processing device has a third transistor, wherein a third emitter of the third transistor is electrically coupled to the anode, wherein a third base of the third transistor is electrically coupled to the first collector of the first transistor through a fourth resistor, wherein a third collector of the third transistor is electrically coupled to the cathode through a first diode and a fifth resistor, and wherein the second collector of the second transistor is electrically coupled to a region between the first diode and the fifth resistor through a second diode.

13. A light emitting diode (LED) lighting device comprising:
an LED lamp series circuit having a first LED lamp and a second LED lamp electrically coupled to one another in series is coupled to the first LED lamp through a lamp coupling point;
an anode, which is a positive electrode supply of the first LED lamp and the second LED lamp;
a cathode, which is a negative electrode supply of the first LED lamp and the second LED lamp;
driver electronics for connection to the anode and the cathode for operation of the LED lamp series circuit; and
a detection device for detecting a failure of the first LED lamp and the second LED lamp,
wherein the detection device, together with the first LED lamp and the second LED lamp, forms a first measuring bridge circuit,
wherein the detection device has a first resistor and a second resistor,
wherein the first resistor and the second resistor are connected to one another in series and form a common resistor coupling point between one another,
wherein the first resistor and the second resistor have the same ohmic resistance,
wherein the detection device has a first transistor and a second transistor,
wherein a first base of the first transistor and a second base of the second transistor form a common base coupling point, and
wherein the base coupling point is electrically coupled to the resistor coupling point through a third resistor,
wherein a first emitter of the first transistor is electrically coupled to a second emitter of the second transistor and to the lamp coupling point, wherein a first collector of the first transistor and a second collector of the second transistor are electrically coupled to a signal processing device of the LED lighting device, and wherein the driver electronics are designed to control an operating state of the LED lamp series circuit as a function of a signal analyzed by the signal processing device.

* * * * *